United States Patent
Davidson

(10) Patent No.: US 7,970,133 B2
(45) Date of Patent: Jun. 28, 2011

(54) SYSTEM AND METHOD FOR SECURE AND FLEXIBLE KEY SCHEDULE GENERATION

(75) Inventor: John H. Davidson, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1065 days.

(21) Appl. No.: 11/335,382

(22) Filed: Jan. 19, 2006

(65) Prior Publication Data

US 2007/0189526 A1 Aug. 16, 2007

(51) Int. Cl.
*H04L 9/08* (2006.01)
*H04L 29/00* (2006.01)

(52) U.S. Cl. .......... 380/44; 380/277; 380/278; 380/279; 713/164; 713/165; 713/166; 713/167

(58) Field of Classification Search .................... 380/44, 380/277, 278, 279, 281, 284; 713/164–167
See application file for complete search history.

(56) References Cited

U.S. PATENT DOCUMENTS

| | | | | |
|---|---|---|---|---|
| 6,044,388 A * | 3/2000 | DeBellis et al. | ............. | 708/254 |
| 7,392,399 B2 * | 6/2008 | Grohoski et al. | ............. | 713/189 |
| 7,424,622 B2 * | 9/2008 | Hashimoto et al. | ........... | 713/194 |
| 7,539,986 B2 * | 5/2009 | Grobman | .......................... | 718/1 |
| 2002/0143842 A1 * | 10/2002 | Cota-Robles et al. | ............ | 709/1 |
| 2003/0031320 A1 * | 2/2003 | Fan et al. | ...................... | 380/255 |
| 2003/0120923 A1 * | 6/2003 | Gilman et al. | ................ | 713/170 |
| 2004/0047466 A1 * | 3/2004 | Feldman et al. | ................ | 380/37 |
| 2004/0208072 A1 * | 10/2004 | Henry et al. | ................... | 365/203 |
| 2005/0094182 A1 * | 5/2005 | Reese et al. | ................... | 358/1.14 |
| 2005/0188216 A1 * | 8/2005 | Crispin et al. | ................ | 713/190 |
| 2006/0020781 A1 * | 1/2006 | Scarlata et al. | ............... | 713/100 |
| 2006/0070066 A1 * | 3/2006 | Grobman | .......................... | 718/1 |
| 2006/0112274 A1 * | 5/2006 | Lee | ................. | 713/171 |
| 2006/0185011 A1 * | 8/2006 | Cromer et al. | ................... | 726/13 |
| 2007/0169024 A1 * | 7/2007 | Drepper | ........................ | 717/139 |
| 2008/0317436 A1 * | 12/2008 | Sasamoto et al. | ............... | 386/95 |
| 2009/0064288 A1 * | 3/2009 | Bagepalli et al. | ................. | 726/4 |
| 2009/0083399 A1 * | 3/2009 | Ocko et al. | ..................... | 709/220 |
| 2009/0089879 A1 * | 4/2009 | Wang et al. | ..................... | 726/24 |
| 2009/0103714 A1 * | 4/2009 | Shirai et al. | ..................... | 380/28 |

* cited by examiner

*Primary Examiner* — Nirav B Patel
*Assistant Examiner* — Sayed Beheshti Shirazi
(74) *Attorney, Agent, or Firm* — Matthew J. Evans; Daniel M. Barbieri

(57) ABSTRACT

The present invention is a method for secure and flexible key schedule generation, which includes loading a key schedule algorithm and a cryptographic algorithm into a cryptographic engine. The method further includes loading the cryptographic algorithm, when selected, into a cryptographic co-processor. The method further includes loading the key schedule algorithm into a separate virtual machine.

13 Claims, 3 Drawing Sheets

US 7,970,133 B2

SYSTEM AND METHOD FOR SECURE AND FLEXIBLE KEY SCHEDULE GENERATION

FIELD OF THE INVENTION

The present invention relates to the field of computing technology and particularly to a system and method for secure and flexible cryptographic key schedule generation.

BACKGROUND OF THE INVENTION

Cryptography programs are often utilized to encrypt/decrypt sensitive data so that it may be transferred between a sender and an intended receiver via a non-secure means. When encrypting/decrypting data in blocks, cryptography programs may utilize a key schedule algorithm (along with a cryptography algorithm) for performing such operations. For example, a cryptography algorithm, such as a block cipher, may be used to encrypt/decrypt blocks of data. An example of a block cipher that may be utilized is a product cipher. The product cipher is an encryption/decryption algorithm that executes in rounds or iterations, encrypting/decrypting a block of data during each round. To encrypt/decrypt a block of data during each round, the product cipher utilizes subkeys generated by a key schedule algorithm. For instance, the key schedule algorithm generates one or more subkeys based on a master encryption/decryption key. Further, during each round, the product cipher then utilizes a subkey provided by the key schedule algorithm to encrypt/decrypt a block of data. Because a number of cryptography programs load key schedule algorithms and/or cryptography algorithms from various outside sources, security issues may arise. In particular, key schedule algorithms are a prime vehicle for Trojan Horse insertion. For example, a user may load a key schedule algorithm as an executable program file into his or her computer from an outside source. However, attached to the key schedule algorithm may also be a malicious program (Trojan Horse) that may compromise the security of the user's computer upon execution by accessing portions (ex.—memory) of the computer containing sensitive data and using the computer's serial ports or other devices for leaking sensitive data.

Therefore, it may be desirable to have a system and method for secure and flexible cryptographic key schedule generation which addresses the above-referenced problems and limitations of the current solutions.

SUMMARY OF THE INVENTION

Accordingly, an embodiment of the present invention is directed to a method for secure and flexible key schedule generation, including: loading a key schedule algorithm and a cryptographic algorithm into a cryptographic engine; loading the cryptographic algorithm, when selected, into a cryptographic co-processor; and, loading the key schedule algorithm into a separate virtual machine.

An additional embodiment of the present invention is directed to a system for cryptographic key schedule generation, including: a host device for receiving a key schedule algorithm and a cryptographic algorithm; a first processor for executing the key schedule algorithm; and a second processor for executing the cryptographic algorithm, wherein the first processor executes the key schedule algorithm within a separate virtual machine of the first processor.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Figure 1:
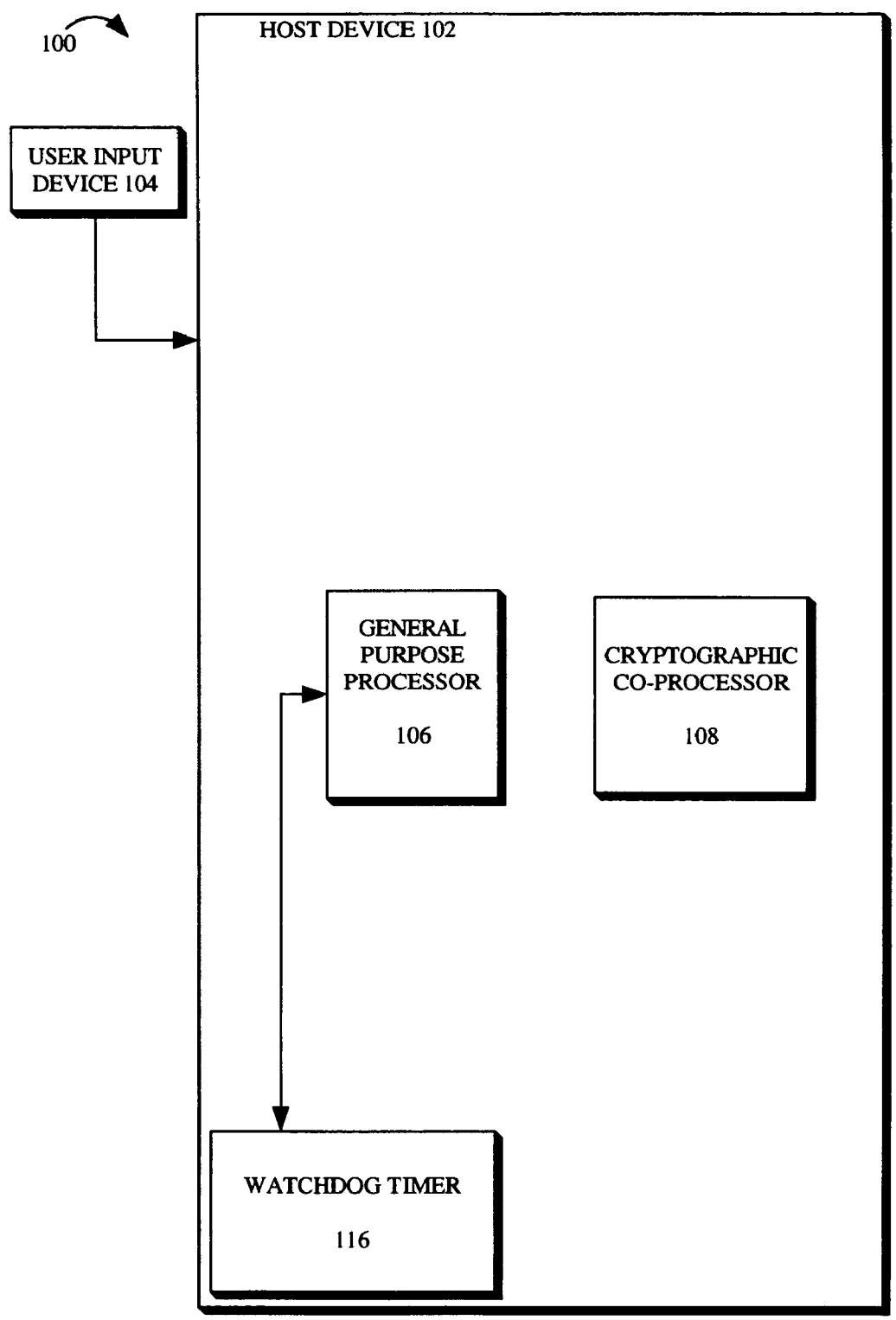
FIG. 1 is a block diagram illustrating a system for key schedule generation in accordance with an exemplary embodiment of the present invention.
Figure 2:
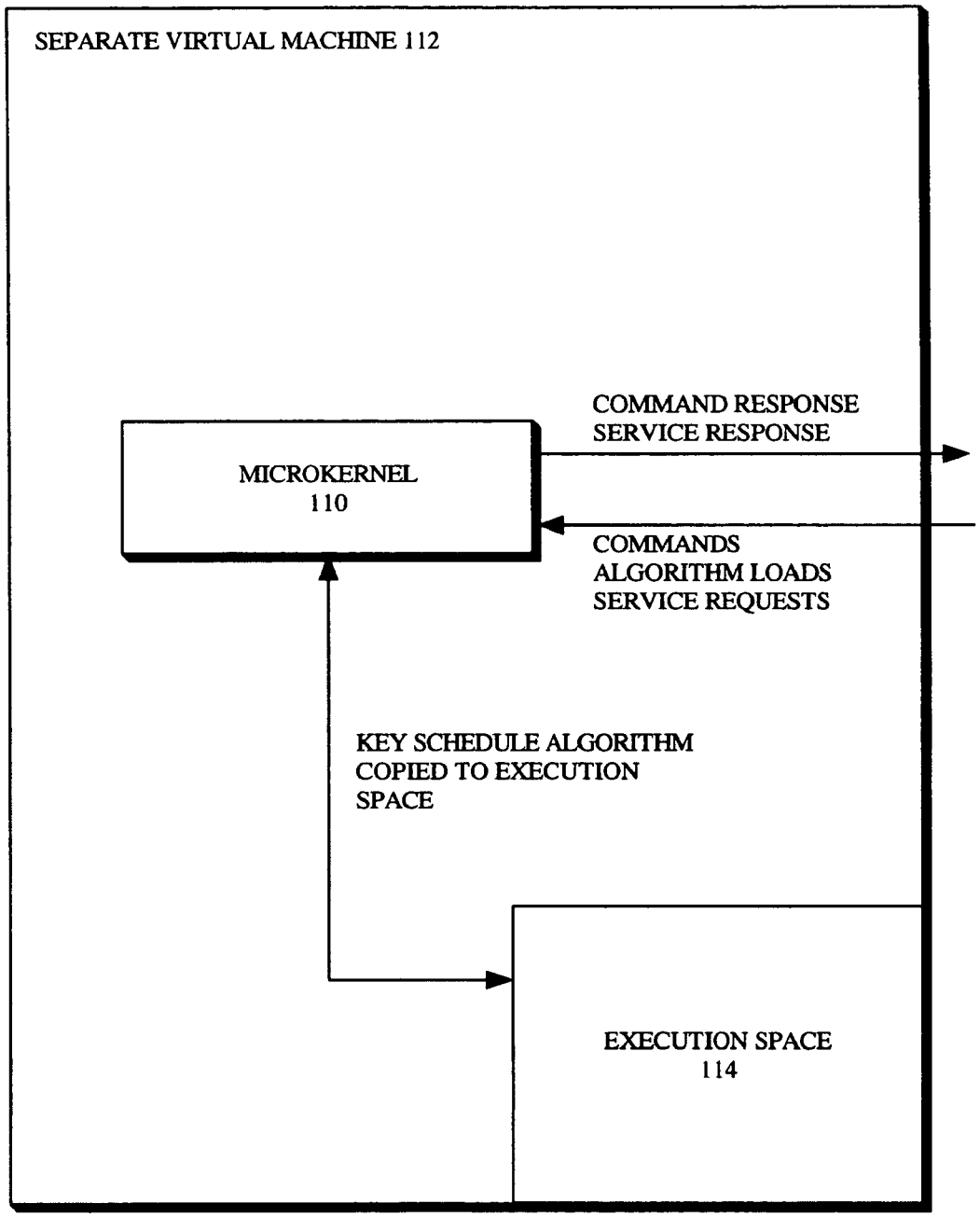
FIG. 2 is a block diagram illustrating a separate virtual machine for key schedule generation in accordance with an exemplary embodiment of the present invention.

Referring generally to FIGS. 1 and 2, a system 100 for secure and flexible cryptographic key schedule generation in accordance with an exemplary embodiment of the present invention is shown. In the exemplary embodiment, the system 100 includes a host device 102, such as a personal computer, which may be configured for receiving a user input, via a communicatively coupled user input device 104, such as a keyboard, a mouse or the like. The host device 102 may further include an operating system (ex.—a platform) for directly controlling and managing basic operations of the system 100 and for providing a platform upon which application software may be run. For instance, the operating system may be a MILS (Multiple Independent Levels of Security) operating system.

Further included with the system 100 are a first processor 106 and a second processor 108. In the exemplary embodiment, the first processor 106 is a general purpose processor, such as an AAMP-7 (Advanced Architecture Micro Processor) processor, for controlling cryptographic operations on the host device 102. Also, the general purpose processor 106 is configured for executing one or more key schedule algorithms. The second processor 108 is a cryptographic co-processor configured for executing one or more cryptographic algorithms, such as encryption/decryption algorithms. The cryptographic co-processor 108 may be used to supplement the functions of the general purpose processor 106, thereby allowing the general purpose processor to offload some processor-intensive tasks (such as executing cryptographic algorithms) and improving the performance of the system 100. In the illustrated embodiment, the cryptographic co-processor 108 is shown as a separate component. It is also contemplated that the cryptographic co-processor may be integrated with the general purpose processor.

The host device 102 may further provide a cryptographic engine for encryption/decryption. For example, the cryptographic engine may be provided via execution of an application software program on the general purpose processor 106 of the host device 102. In the exemplary embodiment, the cryptographic engine includes core software. It is further contemplated that the cryptographic engine of the host 102 may be implemented as a hardware device.

The system 100 further includes, as part of the operating system of the host 102, a microkernel 110 for loading a key schedule algorithm into a separate virtual machine 112. (FIG. 2). The microkernel 110 provides simple abstraction over system hardware and works with operating system-specific servers that provide higher level functions. In an exemplary embodiment, the separate virtual machine 112 is a partition of the general purpose processor 106. In alternative embodiments, the separate virtual machine 112 is a partition of the operating system of the host 102. In the exemplary embodiment, the separate virtual machine 112 provides an execution space 114 within which a key schedule algorithm may execute. In the present embodiment, the separate virtual machine 112 enforces time/space partitioning. The end result is that the key schedule algorithm executes in an environment independent of the cryptographic algorithm.

In further embodiments, the system 100 may include a watchdog timer 116, such as an external (i.e., off-processor) watchdog timer, for ensuring that the key schedule algorithm executing on the separate virtual machine 112 does not exceed a specified time interval. For example, if the key schedule algorithm executes on the separate virtual machine 112 beyond the specified time interval, this may be a symptom that a program fault exists or that the wrong code is being executed. After detecting such a condition, the watchdog timer 116 will cause the cryptographic engine of the host 102 to be reset. In the illustrated embodiment (FIG. 1), the watchdog timer 116 is shown being implemented within the host device 102. However, it is contemplated that the watchdog timer 116 may be implemented external to the host device 102 or in other various configurations.

Figure 3:
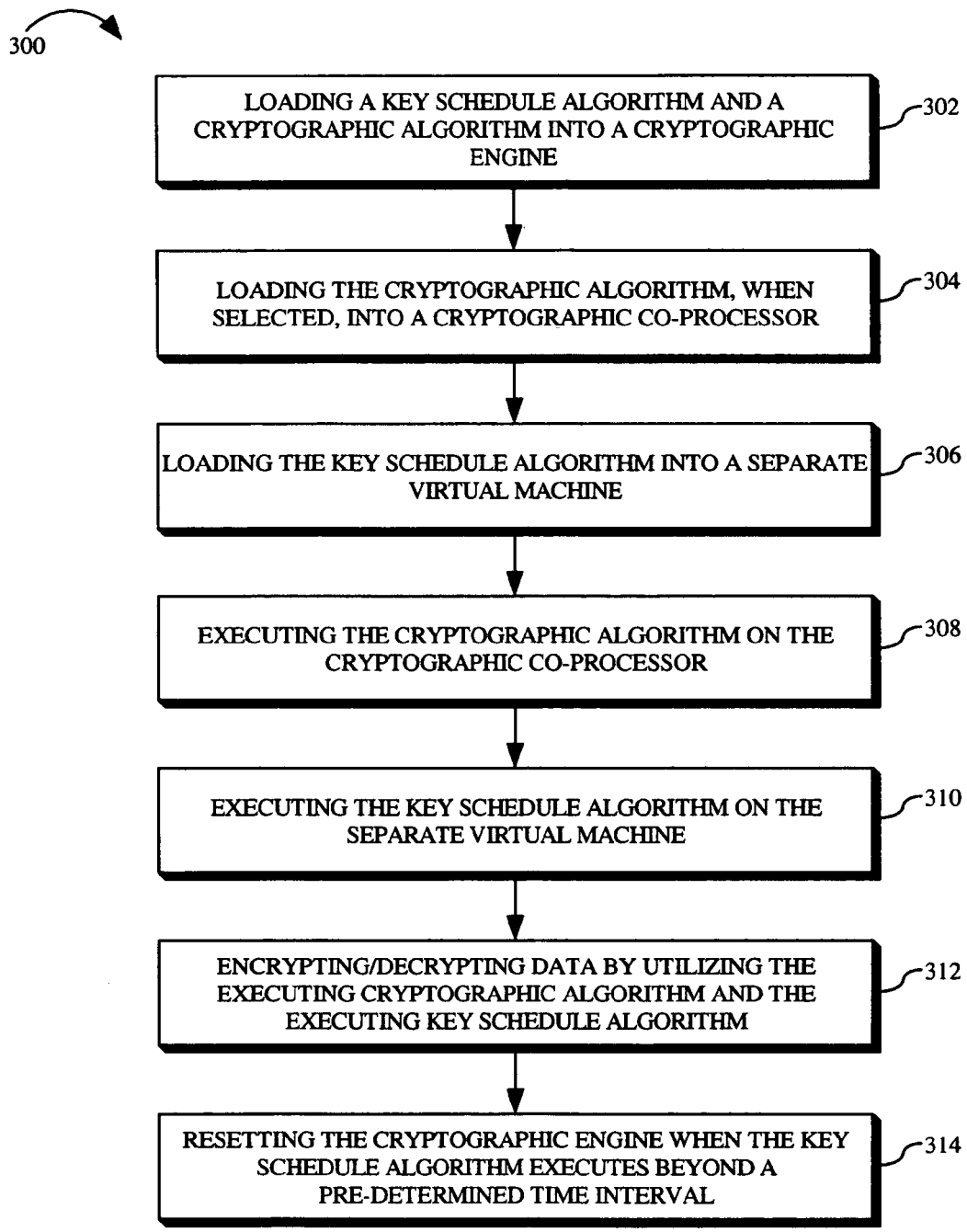
FIG. 3 is a flow chart illustrating a method for key schedule generation in accordance with an exemplary embodiment of the present invention.

FIG. 3 illustrates a method 300 for secure and flexible key schedule generation in accordance with an exemplary embodiment of the present invention. In the exemplary embodiment, the method includes the step of loading a key schedule algorithm and a cryptographic algorithm into the cryptographic engine 302. In the present embodiment, the key schedule algorithm and the cryptographic algorithm may be encrypted and/or digitally signed for ensuring confidentiality and authenticity, respectively. In an exemplary embodiment, the key schedule algorithm and the cryptographic algorithm may be loaded into the cryptographic engine of the host 102 in response to an input command received via the user input device 104.

The method 300 further includes the step of loading the cryptographic algorithm, when selected, into the cryptographic co-processor 304. For example, the cryptographic algorithm may be a product cipher, such as a Feistel cipher, an S-P (Substitution-Permutation) network cipher, or the like. In an exemplary embodiment, the cryptographic algorithm is loaded into the cryptographic co-processor 108 when selected by the host device 102. The method 300 further includes the step of loading the key schedule algorithm into a separate virtual machine 306. In a present embodiment, the separate virtual machine 112 may be a partition of the general purpose processor 106. In alternative embodiments, the separate virtual machine may be a partition of the operating system of the host 102. Further, the step of loading the key schedule algorithm into the separate virtual machine 112 is carried out by the microkernel 110. In the exemplary embodiment, the separate virtual machine 112 provides no access to any memory outside of its execution space 114 and provides no access to any serial ports or other devices. In this way, the microkernel 110 effectively ensures that the key schedule algorithm is separated from the core software of the cryptographic engine and may execute within the provided execution space 114 of the separate virtual machine 112 without interfering with normal operation of the core software.

The method 300 further includes the step of executing the cryptographic algorithm on the cryptographic co-processor 308. The method further includes the step of executing the key schedule algorithm on the separate virtual machine 310. The method further includes the step of at least one of encrypting or decrypting data by utilizing the executing cryptographic algorithm and the executing key schedule algorithm 312. In embodiments utilizing a watchdog timer 116, the method 300 further includes the step of resetting the cryptographic engine when the key schedule algorithm executes beyond a predetermined time interval 314.

The execution space 114 provided within the separate virtual machine 112 serves as a sandbox within which the key schedule algorithm may execute, and from which sensitive system data cannot be leaked. Because key schedule algorithm code has previously been known as a prime candidate for Trojan Horse insertion, the separate virtual machine 112 may protect sensitive data within the system 100 by ensuring that the key schedule algorithm executing within the separate virtual machine's provided execution space 114 will not cause the core software 110 of the cryptographic engine 112 to carry out any malicious operations which could compromise sensitive data of the system 100.

In the exemplary embodiment, the key schedule algorithm executes on the general purpose processor 106 to generate a first output. The cryptographic algorithm executes on the cryptographic co-processor 108 to generate a second output. The core software of the cryptographic engine utilizes the first output and the second output to encrypt/decrypt data. Preferably, the key schedule algorithm that executes on the general purpose processor 106 results in the first output, (ex.—one or more subkeys), which may be utilized by the core software of the cryptographic engine, in conjunction with the second output resulting from the cryptographic algorithm executing on the cryptographic co-processor 108, to encrypt/decrypt data. For example, during execution of the key schedule algorithm, the key schedule algorithm, utilizing a master key, may generate one or more subkeys for each round of the cryptographic algorithm (ex.—product cipher) which may be used for encryption/decryption of blocks of plaintext/ciphertext.

Further, the cryptographic engine may be programmable. In particular, the key schedule algorithm is programmable, so that any cryptographic algorithm may be loaded into the host device 102, without having to modify the core software of the cryptographic engine. Further, the key schedule algorithm may be programmable to execute for a specific time slice or an infinite time slice depending on necessary throughput requirements of the system 100. If the key schedule algorithm is programmed to execute for a specific time slice, the external watchdog timer 116, as discussed above, may be implemented for ensuring the key schedule algorithm does not execute beyond the programmed time slice.

It is to be noted that the foregoing described embodiments according to the present invention may be conveniently implemented using conventional general purpose digital computers programmed according to the teachings of the present specification, as will be apparent to those skilled in the computer art. Appropriate software coding may readily be prepared by skilled programmers based on the teachings of the present disclosure, as will be apparent to those skilled in the software art.

It is to be understood that the present invention may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method for secure and flexible key schedule generation via a host computer, comprising:
    loading a key schedule algorithm and a cryptographic algorithm into a cryptographic engine of the host computer in response to an input command received via a user input device connected to the host computer, wherein the key schedule algorithm and the cryptographic algorithm are at least one of: encrypted and digitally signed;
    loading the cryptographic algorithm, when selected by the host computer, into a cryptographic co-processor; and
    loading the key schedule algorithm into a separate virtual machine, the separate virtual machine being one of: a partition of a general purpose processor of the host computer and a partition of an operating system of the host computer, the separate virtual machine restricting access to memory located outside of an execution space of the separate virtual machine, said separate virtual machine further restricting access to serial ports of the host computer, wherein a microkernel is implemented by the host computer for ensuring that the key schedule algorithm is loaded into the separate virtual machine, the key schedule algorithm being configured for generating subkeys based upon at least one of: a master encryption key and a master decryption key, the cryptographic algorithm being configured for utilizing the subkeys to at least one of: encrypt data; and decrypt data.

2. A method for secure and flexible key schedule generation as claimed in claim 1, further comprising:
    executing the cryptographic algorithm on the cryptographic co-processor.

3. A method for secure and flexible key schedule generation as claimed in claim 2, further comprising:
    executing the key schedule algorithm on the separate virtual machine.

4. A method for secure and flexible key schedule generation as claimed in claim 3, further comprising:
    encrypting data by utilizing the executing cryptographic algorithm and the executing key schedule algorithm.

5. A method for secure and flexible key schedule generation as claimed in claim 3, further comprising:
    decrypting data by utilizing the executing cryptographic algorithm and the executing key schedule algorithm.

6. A method for secure and flexible key schedule generation as claimed in claim 3, further comprising:
    resetting the cryptographic engine when the key schedule algorithm executes beyond a pre-determined time interval.

7. A non-transitory computer-readable medium having computer-executable instructions to be executed by a host computer for performing a method for secure and flexible key schedule generation via said host computer, said method comprising: loading a key schedule algorithm and a cryptographic algorithm into a cryptographic engine of the host computer in response to an input command received via a user input device connected to the host computer, wherein the key schedule algorithm and the cryptographic algorithm are at least one of: encrypted and digitally signed; loading the cryptographic algorithm, when selected by the host computer, into a cryptographic co-processor; loading the key schedule algorithm into a separate virtual machine, the separate virtual machine being one of: a partition of a general purpose processor of the host computer and a partition of an operating system of the host computer, the separate virtual machine restricting access to at least one of: memory located outside of an execution space of the separate virtual machine, ~said separate virtual machine further restricting access to serial ports of the host computer, wherein a microkernel is implemented by the host computer for ensures ensuring that the key schedule algorithm is loaded into the separate virtual machine, the key schedule algorithm being configured for generating subkeys based upon at least one of: a master encryption key and a master decryption key, the cryptographic algorithm being configured for utilizing the subkeys to at least one of: encrypt data; and decrypt data; executing the cryptographic algorithm on the cryptographic co-processor; executing the key schedule algorithm on the separate virtual machine; at least one of: encrypting data by utilizing the executing cryptographic algorithm and the executing key schedule algorithm and decrypting data by utilizing the executing cryptographic algorithm and the executing key schedule algorithm.

8. A computer-readable medium having computer-executable instructions for performing a method for secure and flexible key schedule generation as claimed in claim 7, wherein the cryptographic engine is programmable.

9. A system for cryptographic key schedule generation, comprising:
    a host device for receiving a key schedule algorithm and a cryptographic algorithm, wherein the key schedule algorithm and the cryptographic algorithm are at least one of: encrypted and digitally signed;
    a first processor, wherein the first processor executes the key schedule algorithm; and
    a second processor, wherein the second processor executes the cryptographic algorithm,
    wherein the first processor executes the key schedule algorithm within an execution space of a separate virtual machine of the first processor, said separate virtual machine restricting access to memory located outside of the execution space, said separate virtual machine further restricting access to serial ports of the host device, wherein a microkernel is implemented by the host device for ensuring that the key schedule algorithm is loaded into the separate virtual machine, said execution space of the separate virtual machine preventing the key schedule algorithm from causing core software of the system to carry out malicious operations, the key schedule algorithm being configured for generating subkeys based upon at least one of: a master encryption key and a master decryption key, the cryptographic algorithm being configured for utilizing the subkeys to at least one of: encrypt data; and decrypt data.

10. A system as claimed in claim 9, wherein the first processor is a general purpose processor for controlling the host device.

11. A system as claimed in claim 10, wherein the second processor is a cryptographic co-processor for supplementing functions of the general purpose processor.

12. A system as claimed in claim 11, wherein the separate virtual machine is a partition of the general purpose processor.

13. A system as claimed in claim 9, further comprising a watchdog timer for ensuring that the key schedule algorithm does not execute beyond a specified time interval.

* * * * *